(12) United States Patent
Boice

(10) Patent No.: US 7,337,983 B1
(45) Date of Patent: Mar. 4, 2008

(54) IRRIGATION METHOD AND SYSTEM USING VARIABLE ORIFICES

(76) Inventor: Nelson Boice, 1111 S. Lakemont Ave., No. 737, Winter Park, FL (US) 32792

( * ) Notice: Subject to any disclaimer, the term of this patent is extended or adjusted under 35 U.S.C. 154(b) by 5 days.

(21) Appl. No.: 11/674,248

(22) Filed: Feb. 13, 2007

(51) Int. Cl.
*B05B 17/00* (2006.01)

(52) U.S. Cl. .......................... 239/1; 239/542; 239/547; 239/561; 405/40; 405/44; 405/36

(58) Field of Classification Search .................... 239/1, 239/542, 547, 76, 546; 405/36, 39, 40, 43, 405/44; 700/284; 137/78.2
See application file for complete search history.

(56) References Cited

U.S. PATENT DOCUMENTS

| | | | |
|---|---|---|---|
| 3,797,754 A | * | 3/1974 | Spencer ....................... 239/542 |
| RE31,023 E | * | 9/1982 | Hall, III ........................ 405/37 |
| 4,423,838 A | * | 1/1984 | Dinur ............................. 239/1 |
| 6,953,156 B1 | * | 10/2005 | Boice, Jr. ....................... 239/1 |

* cited by examiner

*Primary Examiner*—Dinh Q. Nguyen
(74) *Attorney, Agent, or Firm*—Matthew G. McKinney; McKinney Law, LLC

(57) ABSTRACT

The present invention is an irrigation method and system for providing a user-defined flow rate to a field using variable sized orifices. The irrigation method and system includes providing a source of irrigation water. A first discrete area to be irrigated is defined and the volume of irrigation water to be disbursed to the first discrete area is determined based on the type of crop. A length of continuous irrigation conduit is provided so that the irrigation conduit is in fluid communication between the source of irrigation water and the first discrete area. The required diameter of each orifice is calculated based on the user-defined flow rate. Each orifice is made in the irrigation conduit as the conduit is installed in the field so that the irrigation water is disbursed to the first discrete area in an amount approximate to the user defined flow rate.

10 Claims, 3 Drawing Sheets

IRRIGATION METHOD AND SYSTEM USING VARIABLE ORIFICES

BACKGROUND OF THE INVENTION

1. Field of the Invention

The present invention relates generally to irrigation systems, and more specifically to using orifices of variable diameter to control the amount of water distributed to a discrete area.

2. Description of the Prior Art

Manifolds are described in general as pipes that branch into other pipes and may use diffusers to divide flow. The flow distribution by a diffuser can be through the use of ports, i.e., orifices, cut in the manifold. The hydraulic head along the length of the manifold will decrease due to friction losses, elevational changes and/or momentum changes. The volume of flow from each orifice is also influenced by the magnitude of the flow velocity. Accordingly, the discharge flow from each orifice will be different along the manifold when the orifices are all the same size.

The fluid mechanic principles that are employed to represent a discharge from a manifold orifice are as follows:

$$q = Ka(2gE)^{0.5}$$

where K=flow coefficient;
a=cross sectional area of port;
$E = V^2/2\ g + \Delta h$; and
V=mean velocity in manifold.
$\Delta h = [(p_m/\gamma) + z_m] - [(p_o/\gamma) + z_o]$, and m and o are subscripts that refer to conditions inside and outside the manifold, respectively, at the section where the port is located.

The orifices are spaced at intervals along the manifold and a change in hydraulic head will occur between orifices due to the head losses in the manifold. The head losses can be represented as follows:

$$h_f = f(L/D)(V^2/2\ g)$$

where L=orifice spacing;
D=diameter of manifold; and
V=mean velocity in the manifold.

To obtain a uniform discharge through each orifice, an iterative process is used to calculate the total required head and assumes that the diameter of the manifold, orifice size, and spacing between orifices is uniform. There are many prior art irrigations systems that rely on manifolds with uniformly spaced orifices and diameter of orifices.

For example, U.S. Pat. No. 6,308,902 to Huntley, uses a topographical map to determine the desired spatial relationship of the irrigation conduits. Huntley uses friction losses in the irrigation conduit itself to adjust the volume of water disbursed through each similarly sized and spaced orifice.

However, the shortcomings of Huntley and the prior art include the inability to adapt to variable field conditions and flow requirements without increasing the length of conduit and thereby increasing costs and waste. Accordingly, there is a need in the relevant art for an irrigation system that has the ability to address variable field conditions due to changes in topography or changing flow requirements for a particular type of crop in a more cost effective and efficient manner. All existing irrigation systems of this type that use irrigation conduits with orifices, have the orifices pre-made in the hose before the installation process in the field as described by Huntley.

Another shortcoming of the prior art includes that an inventory of various irrigation conduits with pre-made orifices must be maintained to address variable topography of a field. This increases the overall costs for the irrigation system. Further, prior art irrigation conduits are typically pre-manufactured for a specific location in the field. Therefore, if the designated irrigation conduit is installed at the incorrect location, the irrigation system will not function properly. In addition, the prior art systems use a higher than needed water pressure and waste energy. Accordingly, there is a need in the relevant art for an irrigation system that is efficient and reduces installation error that can lead to the irrigation system not functioning properly.

There is also a need in the art for an improved irrigation system that is installed using specific GPS location coordinates in a field.

Another need exists in the art to provide an improved irrigation system that provides real-time information of existing field conditions.

Another need exists in the art to provide an improved irrigation system that is easy for field workers to operate and to synchronize.

Another need exists in the art to provide an improved irrigation system that is inexpensive to manufacture.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY OF THE INVENTION

The invention provides an irrigation method and system for providing a user-defined flow rate to a field using variable sized orifices. The irrigation method includes providing a source of irrigation water located at a source location wherein said source of irrigation water having a constant pre-determined hydraulic pressure; determining a first discrete area to be irrigated; determining a first volume of said irrigation water to be disbursed to said first discrete area; determining an elevation of said first discrete area; providing a length of continuous irrigation conduit so that said irrigation conduit is in fluid communication between said source of irrigation water and said first discrete area; calculating a first diameter for a first orifice in said irrigation conduit to disburse said first volume of said irrigation water to said first discrete area; and making said first orifice of said first diameter in said irrigation conduit as said irrigation conduit is installed at said first discrete area so that said irrigation water is disbursed to said first discrete area under a calculated hydraulic pressure.

It is therefore a primary object of the invention to provide an irrigation method and system that has the ability to address variable field conditions due to changes in topography or changing flow requirements for a particular type of crop using variably sized orifices.

Another object of the present invention is to provide an improved irrigation system that provides real-time information of existing field conditions.

Another object of the present invention is to provide an improved irrigation system that is easy for field workers to operate and to synchronize.

Another very important object of the invention is to provide an irrigation system that is installed using specific GPS location coordinates in a field.

Still another important object of the invention is to provide an irrigation system that is inexpensive to manufacture.

These and other important objects, advantages, and features of the invention will become clear as this description proceeds.

The present invention, accordingly, comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
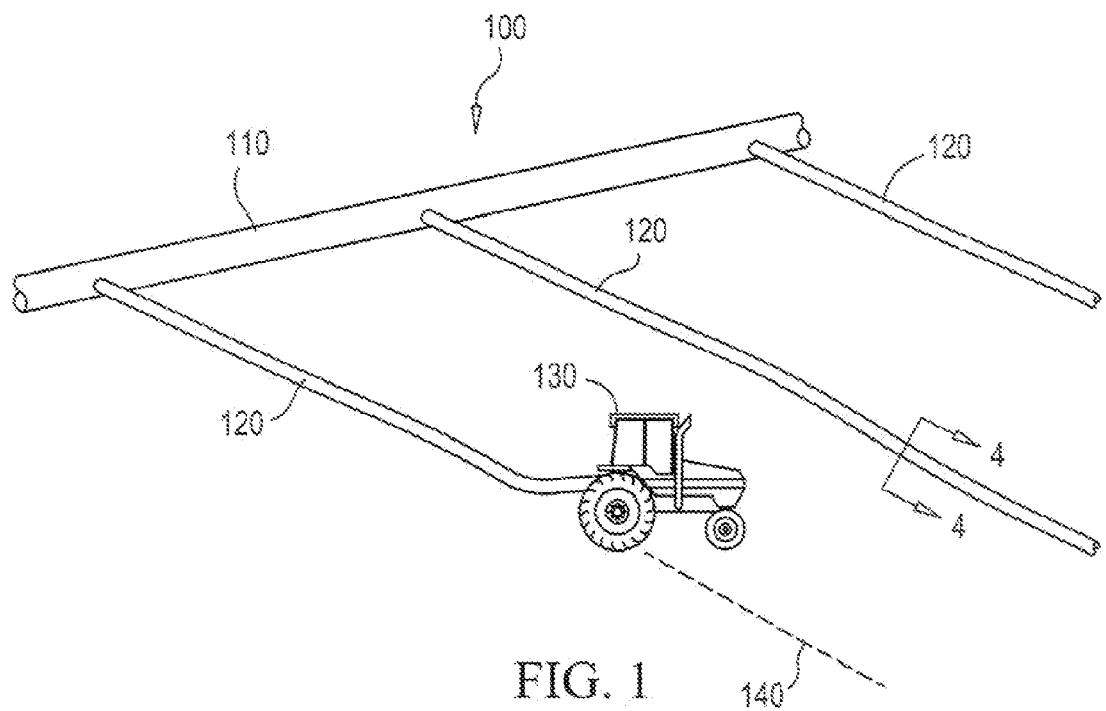
FIG. 1 shows a conceptual view of an embodiment of the present invention.

FIG. 1 illustrates the preferred embodiment of the present invention. As shown therein, the irrigation system 100 comprises a manifold 110 and a plurality of irrigation conduits 120. A first end of manifold 110 is connected to a water source (not shown). The water source provides a constant pre-determined hydraulic pressure used to distribute the irrigation water through the irrigation manifold 110 and conduits 120. In one embodiment of the present invention, an elevated tank is used to create the hydraulic pressure. In an alternative embodiment, a pump is used either independently or in conjunction with the elevated tank to maintain the constant hydraulic pressure.

A tractor 130 is used to install irrigation conduits 120 in crop rows of a field. Tractor's 130 specific location and elevation relative to irrigation system 100 is determined by an on-board GPS system (not shown). A computer-processing unit calculates hydraulic losses in manifold 110 and irrigation conduit 120 to determine a size of an orifice required to deliver a pre-determined volume of water at that specific location where conduit 120 is being installed in the field. As tractor 130 continues traveling through the field, additional orifices are made in irrigation conduit 120 and made of a specific diameter based on calculated hydraulic losses. The spacings between the orifices are determined by the type of crop and volume of irrigation water required.

Figure 2:
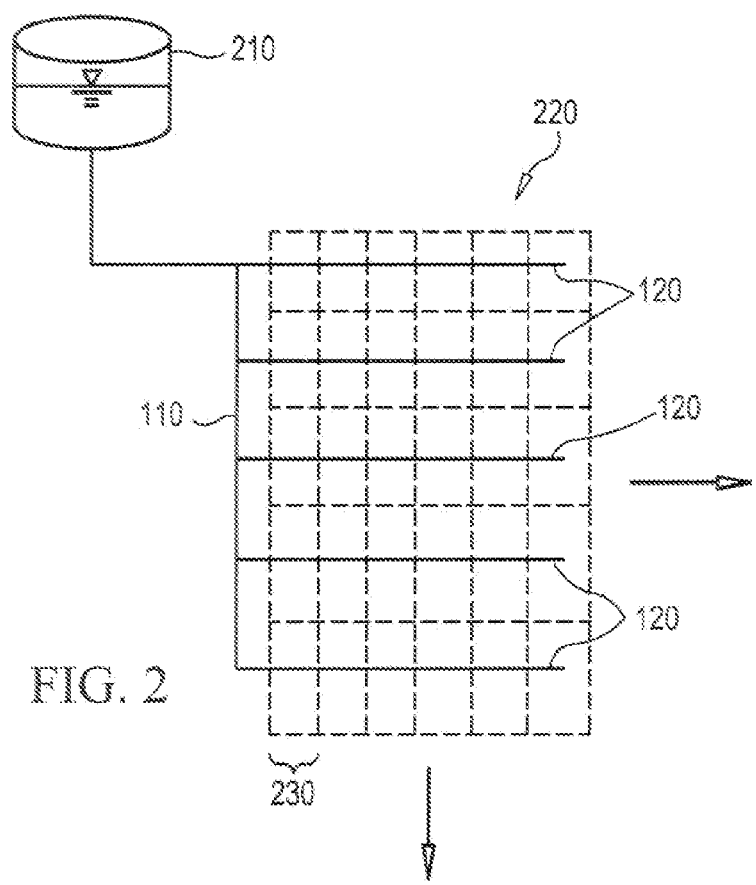
FIG. 2 shows a conceptual view of discrete areas of an embodiment of the present invention.

Referring now to FIG. 2 shows a conceptual view of the present invention. A source of irrigation water 210 provides a constant pre-determined hydraulic pressure to the irrigation conduits 120 that are to be installed in a field 220. Each irrigation conduit 120 is connected to manifold 110. The field 226 is comprised of a plurality of discrete areas 230. As irrigation conduits 120 are installed in field 220 a series of orifices are made in conduit 120. The size of each orifice is calculated to provide the appropriate volume of irrigation water to each discrete area.

A step in the present invention is to determine the total volume of water required by the field 220 in one day at the chosen maximum irrigation rate. Every grower may set his own criteria. For example, the Strawberry Growers Association of Plant City, Fla., states the maximum irrigation required by a mature plants located on 15 inch centers is ⅓ gallon per day. Multiplying the number of plants in the field 220 by this number will provide the amount of the total daily volume of irrigation water needed assuming 3 feet spacing between rows. Accordingly, a one-acre field (208 ft×208 ft) of strawberries requires 3,818 gallons/day. If the desired application is over 24 hours, the required application rate is 2.6 gpm. If the desired application is over 4 hours, the required application rate is calculated as 15.9 gpm.

Figure 3:
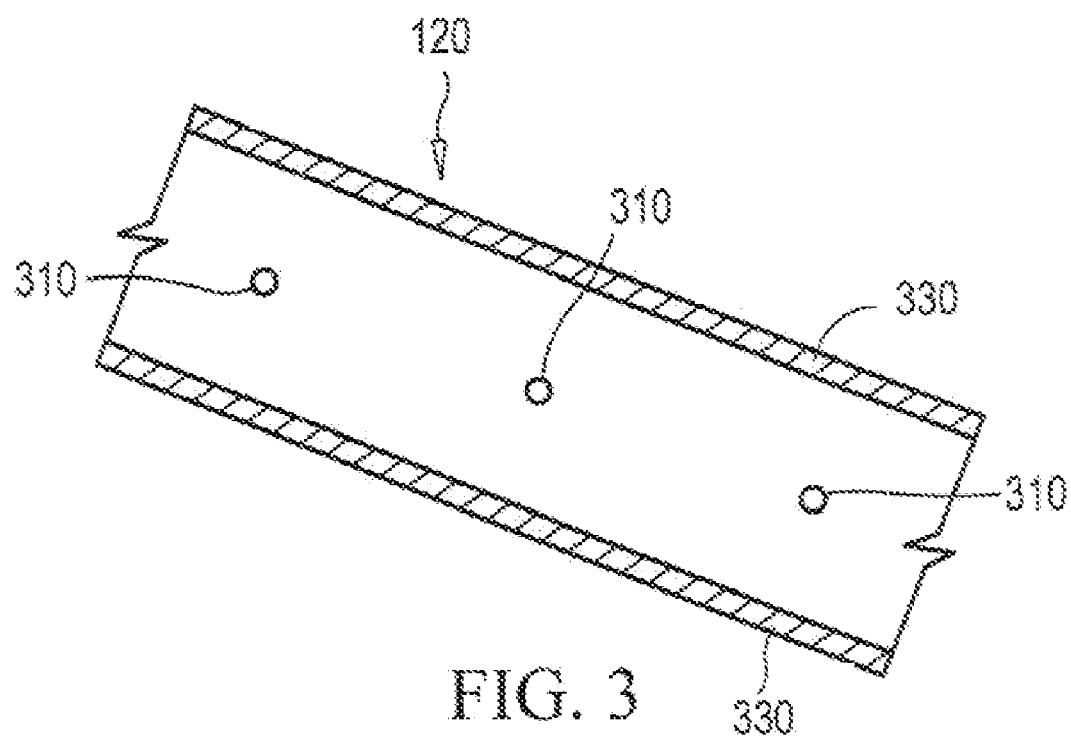
FIG. 3 shows a conceptual view of variable sized orifices calculated and made by the present invention.

Referring now to FIG. 3 shows a conceptual view of orifices 310 in an irrigation conduit 120. Orifices 310 are made in the irrigation conduits 120 to disburse the volume of irrigation water needed at that discrete area 230 as the conduits 120 are installed in the field 220. The sizes of the orifices 310 are calculated using hydraulic principles and taking in account hydraulic losses and other factors that affect the volume of water disbursed through each orifice 310. The size of the orifice 310 also accounts for changes in topography provided through a GPS system (not shown). The installation of the irrigation conduits 120 is coordinated by the GPS system that has spatial information of the conduits 120. Accordingly, with the information of the location of the orifice 310 in the conduit 120 based on spatial relationship to the topography and source of irrigation water, the size of the orifice 310 is calculated and made in the conduit 120 as it is installed in the field 220. The method of making orifices 310 in an irrigation conduit may be (lone in a number of ways, e.g. punch, laser, or other mechanical means well known in the art.

Figure 4:
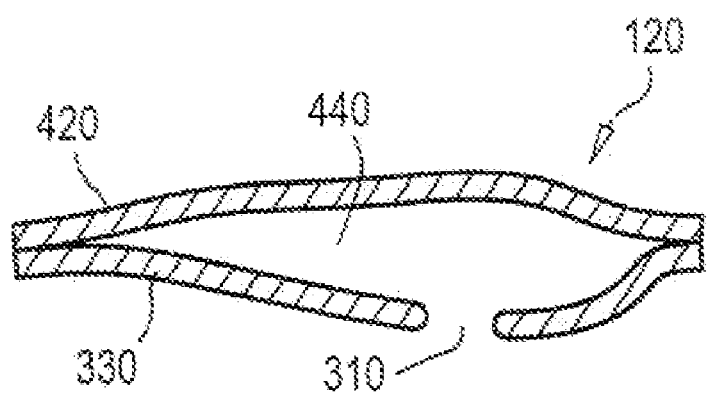
FIG. 4 shows a cross sectional view of the irrigation conduit of an embodiment of the present invention.

FIG. 4 is a cross section of irrigation conduit 120, which includes a planar bottom portion 330 and a planar top portion 420. An orifice 310 is shown in bottom portion 330. Opposing edges of top portion 420 and bottom portion 330 are secured together to form a void so that irrigation water flows therein and distributed, in part, through orifice 310.

Figure 5:
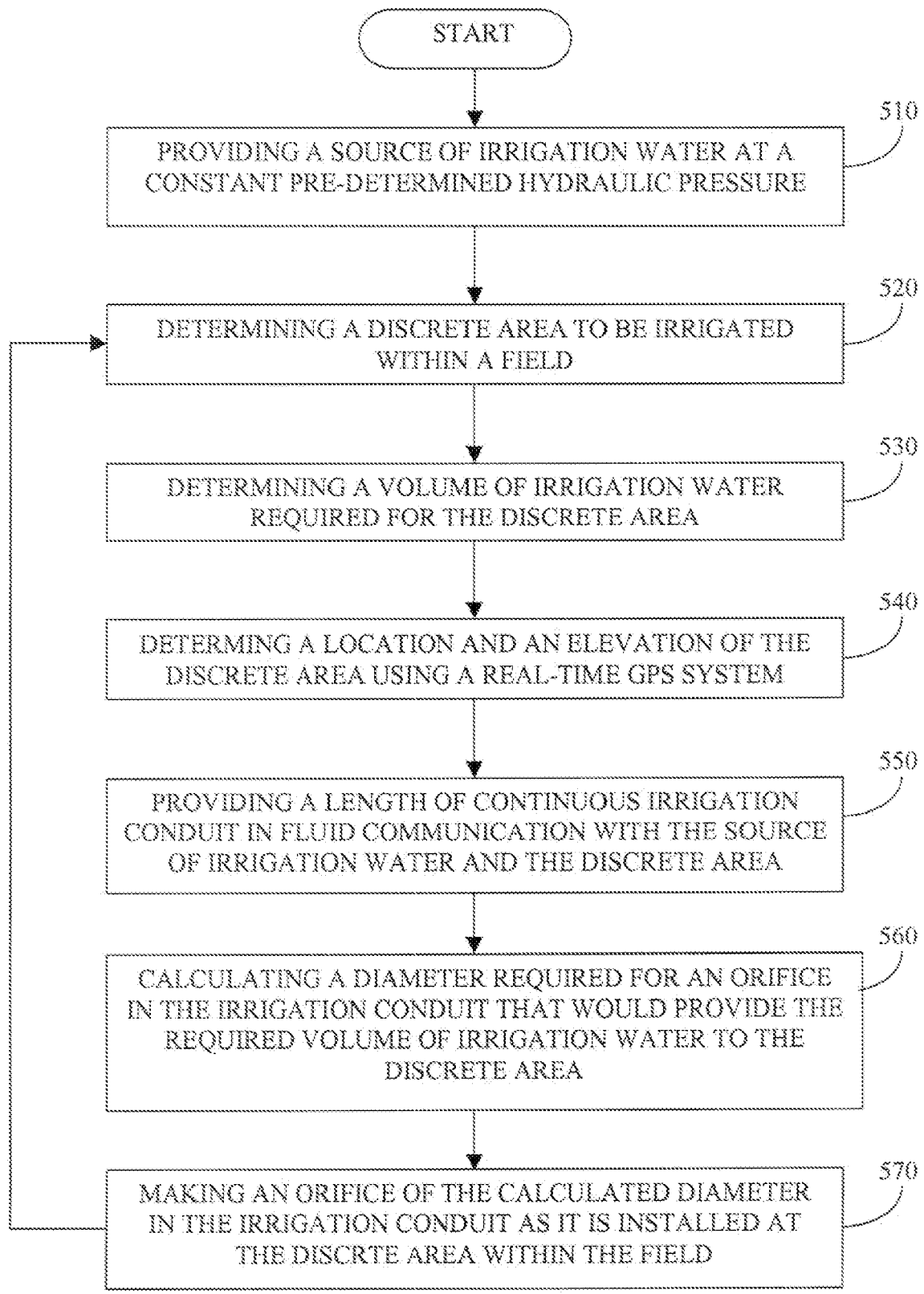
FIG. 5 provides a flowchart illustrating logic that may be used to implement an irrigation method and system according to preferred embodiments of the present invention.

Referring now to FIG. 5 shows a flow chart illustrating logic that may be used to implement preferred embodiments of the method of the present invention. As shown in FIG. 5, the first step is to provide a source of irrigation water at a constant pre-determined hydraulic pressure 510. This allows for an assumption that improves the efficacy of the irrigation system 100. In an alternative embodiment, the pressure of the source of irrigation water may be variable. However, the present invention accounts for changes in hydraulic pressure of the source of irrigation water in calculating the size of the orifices 310. The next step of the method is to determine a discrete area to be provided irrigation water 520. In the preferred embodiment, the area that will be irrigated with a single orifice defines the discrete area. Subsequently, a volume of water required for that discrete area is determined 530. The next step is to acquire data through a GPS system mounted to a tractor in the field and determine the location and elevation of the orifice 540. A length of irrigation conduit is then provided, which is in fluid communication with the source of irrigation water 550. Accordingly, once the parameters are known that would materially affect fluid flow distribution to an orifice is determined, the size of the orifice is calculated 560. An orifice is then made in the irrigation conduit 570 based on the calculated required size of the orifice and the conduit is then installed in the field at the pre-determined location. This process is repeated and additional orifices are made in the irrigation conduit according to the above-described steps until the field is fully irrigated.

Readily understandable diagrams and figures of the present invention described herein illustrate the configurations of the irrigation method and system. The diagrams and figures show those specific details that are pertinent to the present invention so as not to obscure the disclosure with details, which will be readily apparent to those skilled in the art of having the benefit of the description herein. Thus, the diagrams and figures shown in the drawings are primarily intended to show the various components of the invention in convenient functional groupings, so that the present invention may be more readily understood.

Further, the present invention has been described with reference to diagrams and/or flowcharts of methods according to preferred embodiments of the invention. It will be understood that each flowchart illustrating the logic of the present invention can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart.

Accordingly, the particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall there between.

Now that the invention has been described,
What is claimed is:

1. A method for irrigating a field, the method comprising:
   providing a first source of irrigation water located at a first source location wherein said first source of irrigation water having a constant pre-determined hydraulic pressure;
   determining a plurality of discrete areas within said field to be irrigated;
   determining a volume of said irrigation water to be disbursed to each discrete area of said plurality of discrete areas within said field;
   determining an elevation of said each discrete area;
   providing a length of continuous irrigation conduit so that said irrigation conduit is in fluid communication between said first source of irrigation water and said each discrete area of said plurality of discrete areas;
   calculating a specified diameter for each calculated orifice in said irrigation conduit to disburse said volume of said irrigation water to said each discrete area of said plurality of discrete areas;
   making said each calculated orifice of said specified diameter in said irrigation conduit as said irrigation conduit is installed at said each discrete area of said plurality of discrete areas so that said irrigation water is disbursed to said each discrete area under a calculated hydraulic pressure for said each calculated orifice of said specified diameter, wherein said specified diameter is varied for said each calculated orifice that is depended on said calculated hydraulic pressure; and
   providing a laser to make said each calculated orifice of said specified diameter in said irrigation conduit.

2. The method of claim 1 further comprising the step of providing a conduit installing machine for installing said length of continuous irrigation conduit to each said discrete area of said plurality of discrete areas.

3. The method of claim 2 further comprising the step of providing a GPS system for determining the elevation and location of said conduit installing machine.

4. The method of claim 1 further comprising the step of calculating friction losses in said irrigation conduit.

5. The method of claim 1 further comprising the step of providing said volume of said irrigation water to said each discrete area through said each calculated orifice of said specified diameter.

6. A system for irrigating a field, the system comprising:
   a first source of irrigation water located at a first source location wherein said first source of irrigation water having a constant pre-determined hydraulic pressure;
   a plurality of discrete areas within said field to be irrigated
   a volume of said irrigation water to be disbursed to each discrete area of said plurality of discrete areas within said field;
   an elevation of said first each discrete area;
   a length of continuous irrigation conduit so that said irrigation conduit is in fluid communication between said first source of irrigation water and said each discrete area of said plurality of discrete areas;
   a specified diameter for each calculated orifice in said irrigation conduit to disburse said volume of said irrigation water to said each discrete area of said plurality of discrete areas wherein said each calculated orifice is made as said irrigation conduit is installed at said each discrete area so that said irrigation water is disbursed to said each discrete area under a calculated hydraulic pressure for said each calculated orifice of said specified diameter, wherein said specified diameter is varied for each said calculated orifice that is depended on said calculated hydraulic pressure; and
   a laser to make each said calculated orifice of said specified diameter in said irrigation conduit.

7. The system of claim 6 further comprising a conduit installing machine for installing said length of continuous irrigation conduit to each said discrete area of said plurality of discrete areas.

8. The system of claim 7 further comprising a GPS system for determining the elevation and location of said conduit installing machine.

9. The system of claim 6 further comprising a means for calculating friction losses in said irrigation conduit.

10. The system of claim 6 further comprising a means to provide said volume of said irrigation water to said each discrete area through said each calculated orifice of said specified diameter.

* * * * *